(12) United States Patent
Muraoka

(10) Patent No.: US 6,339,323 B1
(45) Date of Patent: Jan. 15, 2002

(54) NOISE REDUCTION FOR A BICYCLE SPOKE, ESPECIALLY USEFUL AS A MAGNETIC DEVICE

(75) Inventor: Tsutomu Muraoka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/280,822

(22) Filed: Mar. 30, 1999

(51) Int. Cl.⁷ .................. G01P 3/44; G01P 3/487; B60B 1/00; B62J 39/00
(52) U.S. Cl. .................. 324/174; 280/288.4; 301/37.41
(58) Field of Search .................. 324/166, 171, 324/173, 174; 301/37.41; 280/288.4

(56) References Cited

U.S. PATENT DOCUMENTS

| | | | | |
|---|---|---|---|---|
| 2,344,542 A | * | 3/1944 | Fike | 301/37.41 X |
| 3,007,743 A | * | 11/1961 | Lange | 301/37.41 |
| 3,854,777 A | | 12/1974 | Kennedy | 301/37 |
| 3,879,089 A | * | 4/1975 | Stults et al. | 301/37.41 |
| 3,898,563 A | | 8/1975 | Erisman | 324/166 |
| 3,947,070 A | * | 3/1976 | Brilando et al. | 301/37.41 X |
| 4,037,924 A | * | 7/1977 | May | 301/37.41 X |
| 4,331,918 A | | 5/1982 | Dunch | 324/174 |
| 4,352,063 A | | 9/1982 | Jones et al. | 324/171 |
| 5,089,775 A | | 2/1992 | Takeda | 324/174 |
| 5,264,791 A | | 11/1993 | Takeda | 324/174 |

FOREIGN PATENT DOCUMENTS

| | | |
|---|---|---|
| DE | 32 26 357 A1 | 1/1984 |
| JP | 4-135995 A | 5/1992 |
| JP | 7-23692 | 5/1995 |
| WO | 97/46072 A2 | 12/1997 |

OTHER PUBLICATIONS

Cateye Astrale Cyclocomputer, Model CC–CD100; Ten catalog pages; Prior to Feb. 1999.

Cateye General Catalog; Cycle Accessories; Thirteen Catalog pages; 1996. No Month.

* cited by examiner

*Primary Examiner*—Gerard R. Strecker
(74) *Attorney, Agent, or Firm*—Shinjyu Gloabl IP Counselors, LLP

(57) ABSTRACT

A noise reduction device is provided that mounts at the intersection of a pair of spokes of a bicycle wheel. The noise reduction device can also have magnetic properties for use with a bicycle monitoring device. In a preferred embodiment, the noise reduction device is a magnetic device that has a body portion and a magnet. The body portion has at least one spoke-receiving recess on one side, and at least another spoke-receiving recess on the other side. In an alternate embodiment, the spoke-receiving recesses are irregularly shaped, so as to accommodate a variety of spoke angles. When the magnetic device is used with a monitoring device, it communicates with a sensing device, which is adapted to be coupled to a portion of the bicycle that is adjacent to a wheel of the bicycle. A display unit is adapted to be mounted on handlebars of the bicycle for displaying the speed of the bicycle or other information obtained from sensing the rotation of the wheel.

44 Claims, 5 Drawing Sheets

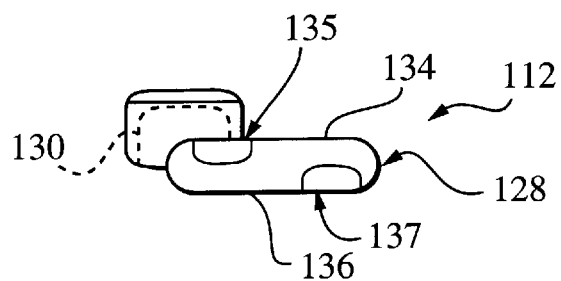
FIG. 14
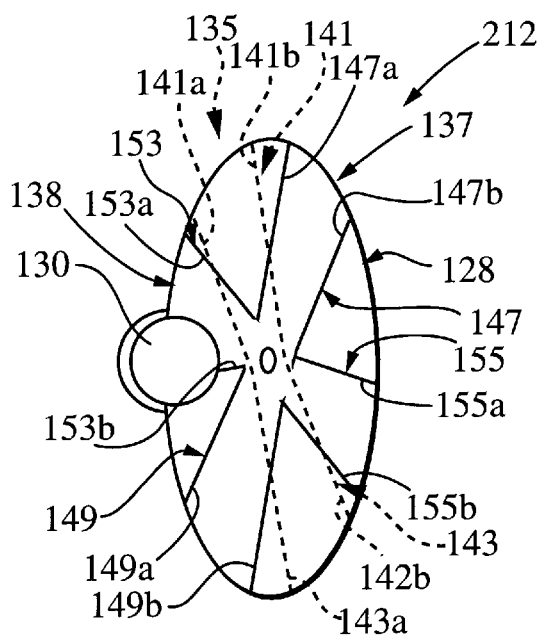 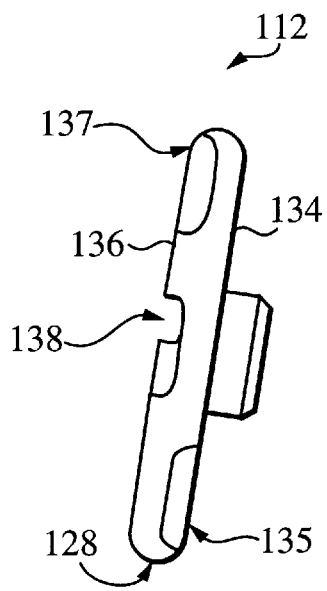
FIG. 15   FIG. 16
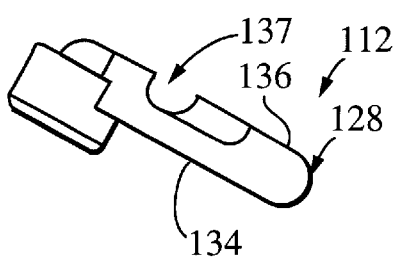 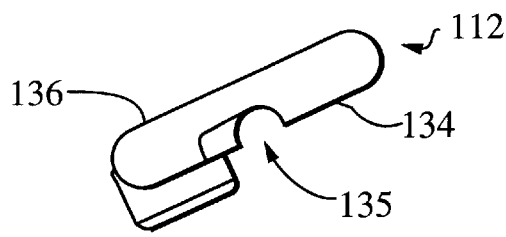
FIG. 17   FIG. 18

NOISE REDUCTION FOR A BICYCLE SPOKE, ESPECIALLY USEFUL AS A MAGNETIC DEVICE

BACKGROUND OF THE INVENTION

1. Field of the Invention

This invention generally relates to a noise reduction device that can be easily installed onto a spoke of a bicycle wheel. More specifically, the present invention relates to a noise reduction device that reduces noise between spokes. When magnetic material is utilized with the noise reduction device, it can work with a speed monitoring device.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. This has resulted in many different types of bicycle wheels.

The strength of wheel depends on a number of factors, including the number of spokes, the size of the spokes, the shapes of the spokes and other things. Racers use fewer spokes in order to decrease wind resistance. Using fewer spokes also decreases the weight of the wheel. Thus, avid cyclists are continually experimenting with the number of spokes.

A relatively conventional wheel has thirty-six spokes, with adjacent spokes intersecting each other at approximately 27°. Such spokes are typically approximately two millimeters in diameter. More recently, bicycle wheels have been designed with fewer spokes to improve the performance of the bicycle wheel. For example, bicycle wheels have been developed with sixteen spokes. A bicycle wheel with sixteen spokes typically has its spokes intersecting at approximately 54°.

One problem common among bicycles with intersecting spokes is that there is noise during flexing of the wheel. Previously, the typical way this problem was eliminated was to solder the crossed parts of the two spokes. But sometimes soldering did not hold the spokes with sufficient tightness. Other fastening means were developed, but had the limitation of being restricted to wheels with a specific number of spokes. This is a problem because not all bicycles have the same number of spokes.

It is also an advantage for modem cyclists to know how fast they are going. This is true in both non-competitive and competitive cycling. To that end, speedometer devices for bicycles have become commercially popular. Early forms of these devices had various mechanical disadvantages. One source of difficulty was the means by which the speedometer device sensed that the wheel had rotated. Many speedometers attached a counting device that protruded from the spoke, and would advance a gear or a counter every time the wheel rotated. But these devices were not reliable and subject to breakdown, bending, stiffening, and shifting loose from the appropriate position. This led to inductive-type sensors, which did away with the requirement of actual contact between spoke-attachment and sensor. But these were not always reliable either, due to magnets weakening, slippage on the spoke, tools required for installation, inability to sustain a satisfactory level of tightness, and other reasons.

In view of the above, there exists a need for noise reduction device or a magnetic device which overcomes the above mentioned problems in the prior art. This invention addresses this need in the prior art as well as other needs, which will become apparent to those skilled in the art from this disclosure.

SUMMARY OF THE INVENTION

One object of the present invention is to provide a noise reduction device that is relatively easy to install between two spokes.

Another object of the present invention is to provide a noise reduction device that includes magnetic properties to operate with a bicycle monitoring device.

Another object of the present invention is to provide a noise reduction device that is inexpensive to manufacture.

Another object of the present invention is to provide a noise reduction device that can be installed in one step.

Another object of the present invention is to provide a noise reduction device that requires no tools for installation.

Another object of the present invention is to provide a noise reduction device that works with a range of spoke angles.

The foregoing objects can be attained by providing a noise reduction device adapted to be mounted between a first spoke and a second spoke at a point of intersection therebetween, comprising a body portion having a first side and a second side, the first side having at least one first spoke-receiving recess extending in a first direction to receive a portion of the first spoke therein, and the second side having at least one second spoke-receiving recess extending in a second direction to receive a portion of the second spoke therein, the first direction forming an angle with the second direction.

The foregoing objects can also be attained by providing a monitoring device for a bicycle, comprising a sensing device adapted to be coupled to a portion of the bicycle that is adjacent a wheel of the bicycle; a display unit adapted to be mounted on handlebars of the bicycle; and a magnetic device adapted to be mounted on wheel spokes, the magnetic device having a body portion with magnetic material, the body portion having a first side and a second side, the first side having a first spoke-receiving recess extending in a first direction to receive a portion of the first spoke therein, and the second side having a second spoke-receiving recess extending in a second direction to receive a portion of the second spoke therein, the first direction forming an angle with the second direction.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 14 is a top plan view of a noise reduction device or magnetic device in accordance with a third embodiment of the present invention;

FIG. 15 is a front elevational view of the noise reduction device or magnetic device as illustrated in FIG. 14;

FIG. 16 is a right side view of the noise reduction device or magnetic device as illustrated in FIGS. 14 and 15 as viewed along the axis of the third spoke-receiving recess or groove;

FIG. 17 is a left bottom view of the noise reduction device or magnetic device as illustrated in FIGS. 14–16 as viewed along the axis of the second spoke-receiving recess or groove;

FIG. 18 is a right bottom view of the noise reduction device or magnetic device as illustrated in FIGS. 14–17 as viewed along the axis of the first spoke-receiving recess or groove;

DETAILED DESCRIPTION OF THE PREFERRED EMBODIMENTS

Figure 1:
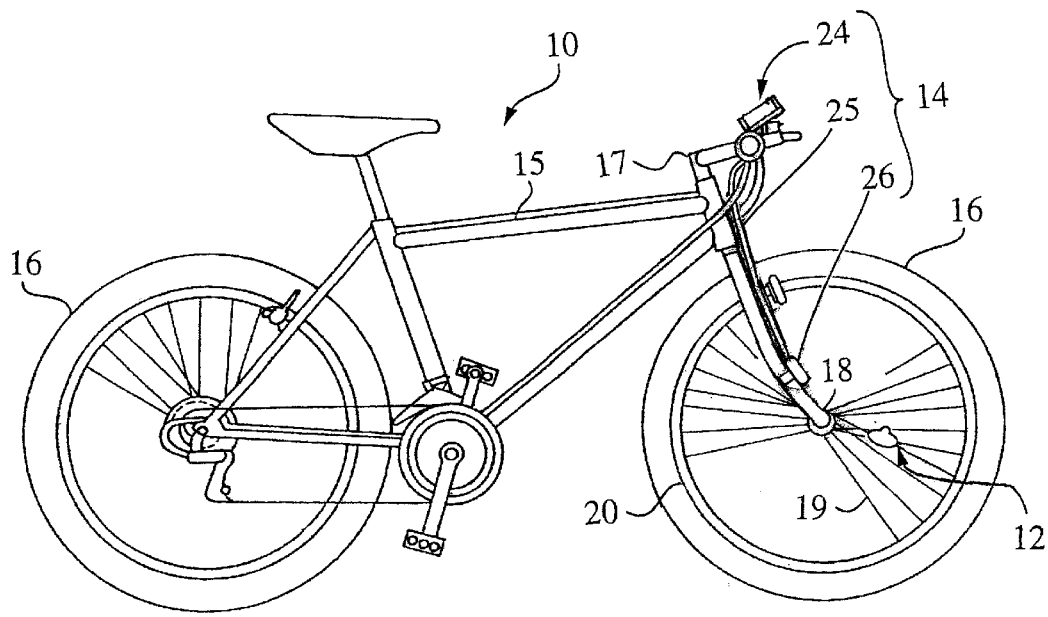
FIG. 1 is a side elevational view of a bicycle with a monitoring device mounted thereto in accordance with the present invention.

Referring initially to FIG. 1, a bicycle 10 is illustrated with a noise reduction device 12 mounted thereon in accordance with the present invention. In the most preferred embodiment of the present invention, the noise reduction device 12 is a magnetic device that is used in conjunction with a monitoring device 14. Monitoring device 14 is coupled to the bicycle 10 in a conventional manner. In this preferred embodiment, the noise reduction device 12 performs two functions. First, noise reduction device 12 reduces noise during riding of the bicycle 10. Second, noise reduction device 12 acts as part of the monitoring device 14.

Bicycles and their various components are well known in the art, and thus, bicycle 10 and its various components will not be discussed or illustrated in detail herein, except for the components that relate to the present invention. In other words, only noise reduction device 12 and monitoring device 14 and the various components of bicycle 10 relating thereto will be discussed and/or illustrated herein.

Bicycle 10 basically includes a frame 15, a pair of wheels 16 and a handlebar 17. Handlebar 17 is movably attached to frame 15 for turning front wheel 16. Each of the wheels 16 are conventional wheels that are rotatably coupled to frame 15 in a conventional manner. Each of the wheels 16 has a hub 18, a plurality of spokes 19 and a rim 20. Spokes 19 of each of the wheels 16 extend between hub 18 and rim 20. While the hubs 18 for the wheels 16 are different in the front and rear wheels, these differences are not important to this invention.

Monitoring device 14 basically includes a display unit 24, a wire 25, a sensor 26 and the noise reduction device 12 mentioned above. All the parts are basically conventional parts that are well known in the bicycle art, except for noise reduction device 12 that is the subject of the present invention. Therefore, display unit 24, wire 25 and sensor 26 will not be discussed or illustrated in detail herein.

One example of a prior art monitoring device is disclosed in U.S. Pat. No. 5,264,791 which is assigned to Cateye, Inc. This U.S. patent is hereby incorporated herein by reference for the purpose of understanding one particular use of the noise reduction device 12 in accordance with the present invention. Of course, display unit 24 mentioned above can be of the type mentioned in this U.S. patent or any other prior art device. Similarly, the sensor 26 can be a reed switch or any other type of magnetic sensor that is known in the art.

Figure 2:
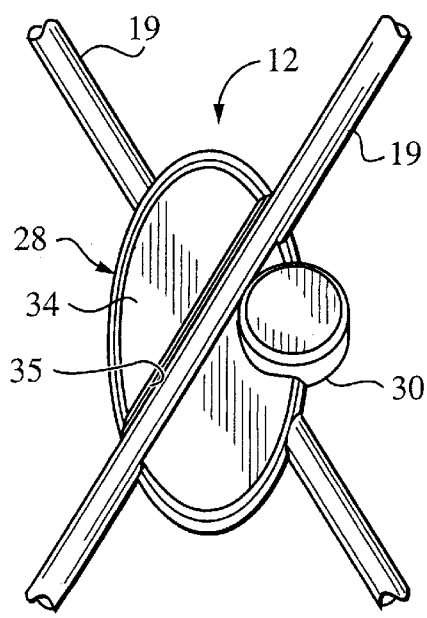
FIG. 2 is a partial rear perspective view of a noise reduction device or magnetic device mounted on two spokes in accordance with a first embodiment of the present invention.
Figure 3:
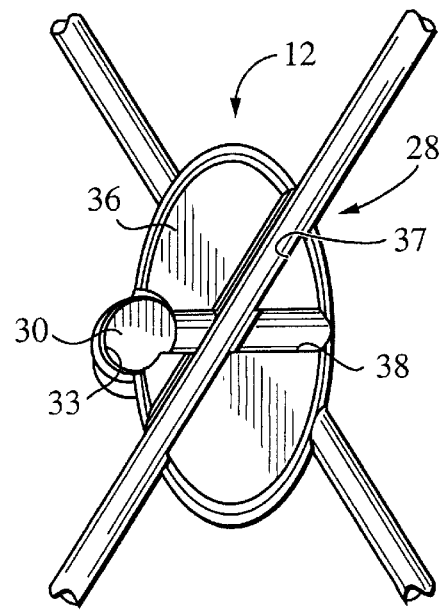
FIG. 3 is a partial front perspective view of a noise reduction device or magnetic device illustrated in FIG. 2 while mounted on a pair of spokes.
Figure 4:
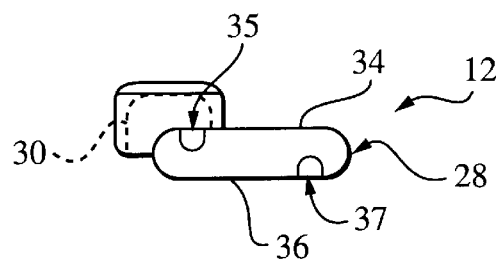
FIG. 4 is a top plan view of the noise reduction device or magnetic device illustrated in FIGS. 2 and 3.

As best seen in FIGS. 2 and 3, noise reduction device 12 is located at the intersection of two spokes 19. More specifically, noise reduction device 12 is pinned between two spokes 19 to retain noise reduction device 12 thereon. The adjacent spokes 19 can no longer rub against each other when noise reduction device 12 is located therebetween. Therefore, noise due to flexing of wheel 16 is reduced when noise reduction devices 12 are located between the spokes 19. Noise reduction device 12 basically includes a body portion 28 with a magnet 30 fixedly coupled thereto. Body portion 28 is integrally formed as a one-piece, unitary member, preferably of lightweight material. For example, body portion 28 can be molded as a one-piece, unitary member from plastic types of materials that can accomplish the essence of the present invention. Body portion 28 can alternatively be made of magnetic or magnetized material eliminating the need for a separate magnet 30. For example, body portion 28 can be constructed of a plastic material with magnetic particles embedded therein. Body portion 28 can also have no magnetic properties whatsoever, and serve as a noise-reduction device only.

Preferably, body portion 28 has a cylindrical magnetic portion with a magnet cavity 33 for receiving magnet 30 as seen in FIG. 3. Magnet 30 can be either frictionally or adhesively secured within cavity 33. Magnet 30 should have a magnetism that is strong enough to properly operate sensor 26 during rotation of wheel 16.

Body portion 28 is a substantially oval-shaped member having a first side 34 with a first spoke-receiving recess 35, and a second side 36 with second and third spoke-receiving recesses 37 and 38 as shown in FIGS. 2 and 3. These spoke-receiving recesses 35, 37 and 38 are designed such that spoke-receiving recess 35 is utilized with either spoke-receiving recess 37 or spoke-receiving recess 38 so that a pair of spokes 19 are coupled to body portion 28 at their intersection. Magnet 30 extends outwardly from first side 34.

While spoke-receiving recesses 35, 37 and 38 are shown as elongated grooves, it will be apparent to those skilled in the art that the spoke-receiving recesses can be formed by pins or protrusions extending outwardly from a body member. Accordingly, the term "spoke-receiving recess" should not be limited to a groove as shown in the figures. Rather, it will be apparent to those skilled in the art from this disclosure that the term "spoke-receiving recess" should be construed to include any space located between a pair of opposed surfaces that define a spoke-receiving space.

Figure 5:
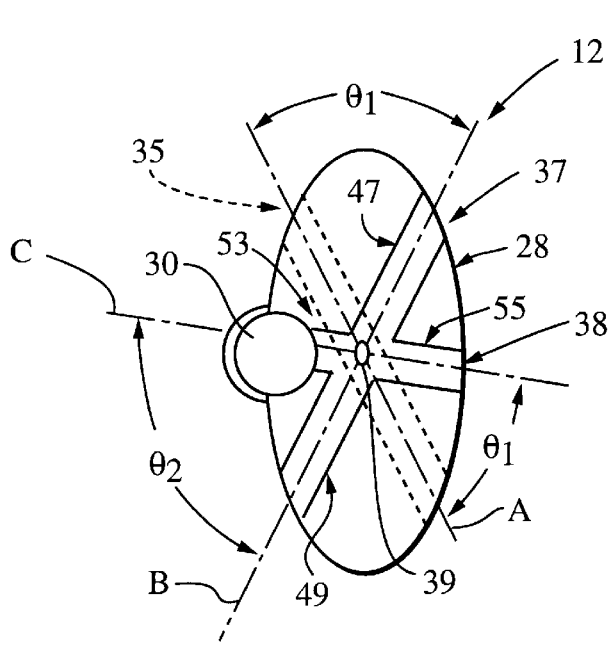
FIG. 5 is a front elevational view of the noise reduction device or magnetic device illustrated in FIGS. 2–4.
Figure 6:
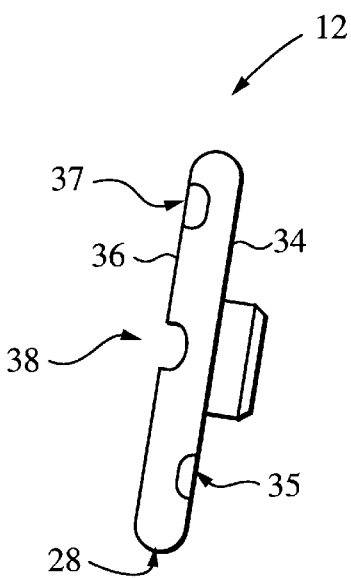
FIG. 6 is a right side view of the noise reduction device or magnetic device illustrated in FIGS. 2–5 as viewed along the axis of the third spoke-receiving groove.
Figure 7:
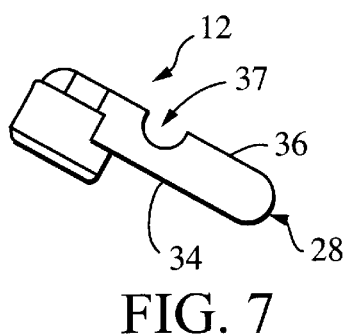
FIG. 7 is a left bottom view of the noise reduction device or magnetic device illustrated in FIGS. 2–6 as viewed along the axis of the second spoke-receiving groove.
Figure 8:
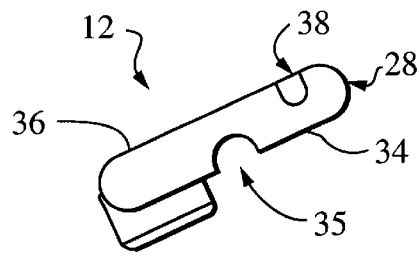
FIG. 8 is a right bottom view of the noise reduction device or magnetic device illustrated in FIGS. 2–7 as viewed along the axis of the first spoke-receiving groove.
Figure 9:
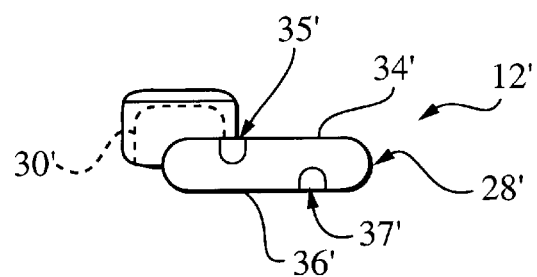
FIG. 9 is a top plan view of a noise reduction device or magnetic device in accordance with a second embodiment of the present invention.

These three spoke-receiving recesses 35, 37 and 38 extend diagonally through a center section of body portion 28. The three spoke-receiving recesses 35, 37 and 38 have depths such that the bottoms of the recesses lie substantially in the same plane. Accordingly, at the center section of body portion 28, a small diamond-shaped hole or film 39 is formed at the intersection of spoke-receiving recesses 35, 37 and 38 as seen in FIG. 5. It is important that the noise reduction device 12 does not bow or otherwise stress the spokes 19. Accordingly, spoke-receiving recesses 35, 37 and 38 should be configured such that the spokes 19 are not stressed when received therein. If the bottoms of spoke-receiving recesses 35, 37 and 38 lie in planes that are slightly offset from each other such that a small film of material 39 is formed between the bottoms of the spoke-receiving recesses 35, 37 and 38 at their intersection. This thin film 39 is preferably no greater than approximately one millimeter in thickness.

In this embodiment, spoke-receiving recesses 35, 37 and 38 have uniform widths of approximately three millimeters for accommodating flat spokes that are approximately three millimeters in width or diameter. Of course, noise reduction device 12 can be used with smaller diameter spokes. Moreover, the size and shape of spoke-receiving recesses 35, 37 and 38 can be designed to accommodate various spoke diameters and/or shapes.

Referring to FIGS. 4–8, first spoke-receiving recess 35 is a continuous elongated groove that receives one of the spokes 19. Second and third spoke-receiving recesses 37 and 38 of second side 36 that receive another spoke 19 intersect with each other at the center section of body portion 28. Accordingly, second and third spoke-receiving recesses 37 and 38 are discontinuous elongated grooves. Second spoke-receiving recess 37 has a pair of sections 47 and 49. Third spoke-receiving recess 38 has a pair of sections 53 and 55.

First spoke-receiving recess 35 is located on first side 34 and has a center axis A extending in a first radial direction. Second spoke receiving recess 37 has a center axis B extending in a second radial direction that forms an angle $\theta_1$ with center axis A of first spoke-receiving recess 35. Third spoke-receiving recess 38 has a center axis C extending in a third radial direction. Third center axis C forms an angle $\theta_2$ with second center axis B and forms an angle $\theta_1$ with first center axis A. In this embodiment, as shown in FIG. 5, angles $\theta_1$ measure approximately 54°, while angle $\theta_2$ measures approximately 72°.

During installation of noise reduction device 12, the two adjacent spokes 19 are pulled apart and body portion 28 is inserted at the intersection of the two spokes 19. In particular, one of the spokes 19 is received in spoke-receiving recess 35, while the other spoke 19 is received in spoke-receiving recess 37 or 38. Body portion 28 is retained between the two spokes 19 by the natural pressing force or tension that exists between the two spokes 19. Hole or thin film 39 minimizes the pressing force or tension between the spokes 19. Therefore, bowing or bending of spoke 19 does not occur, or occurs to a lesser extent because of hole or thin film 39. Also, longitudinal movement of noise reduction device 12 along the longitudinal axis of either spoke 19 is resisted by the intersection of spoke-receiving recess 35 with spoke-receiving recess 37 or 38. Because body portion 28 is secured by the tension of the two spokes 19, no further securing means, such as a screw or a cover, is necessary. Accordingly, noise reduction device 12 can be installed in one step, and requires no tools for installation.

Second Embodiment

Referring now to FIGS. 9–13, a noise reduction device 12' is illustrated in accordance with another embodiment of this invention. Noise reduction device 12 can be used with monitoring device 14 of FIG. 1. In view of the similarities between this embodiment and the prior embodiment, this embodiment will not be discussed or illustrated in detail herein. Rather, it will be apparent to those skilled in the art from this disclosure that descriptions of similar parts of the prior embodiments also apply to the similar or identical parts of this embodiment.

Preferably, noise reduction device 12' has a body portion 28' with a magnet 30' coupled in a cylindrical magnetic portion. Specifically, a magnet cavity 33' is provided for receiving magnet 30'. Magnet 30' can be either frictionally or adhesively secured within cavity 33'. Magnet 30' should have a magnetism that is strong enough to properly operate sensor 26 during rotation of wheel 16 (FIG. 1).

Body portion 28' is a substantially oval-shaped member having a first side 34' with a first spoke-receiving recess 35', and a second side 36' with second and third spoke-receiving recesses 37' and 38' as shown in FIGS. 10–13. Magnet 30' extends outwardly from first side 34'. These spoke-receiving recesses 35', 37' and 38' are designed such that spoke-receiving recess 35' is utilized with either spoke-receiving recess 37' or spoke-receiving recess 38' so that a pair of spokes 19 are coupled to body portion 28' at their intersection.

While spoke-receiving recesses 35', 37' and 38' are shown as elongated grooves, it will be apparent to those skilled in the art that the spoke-receiving recesses can be formed by pins or protrusions extending outwardly from a body member. Accordingly, the term "spoke-receiving recess" should not be limited to a groove as shown in the figures. Rather, it will be apparent to those skilled in the art from this disclosure that the term "spoke-receiving recess" should be construed to include any space located between a pair of opposed surfaces that define a spoke-receiving space.

These three spoke-receiving recesses 35', 37' and 38' extend diagonally through a center section of body portion 28'. The three spoke-receiving recesses 35', 37' and 38' have a depth such that the bottom of the recesses lie substantially in the same plane. Accordingly, at the center section of body portion 28', a small diamondshaped hole or thin film 39' is formed at the intersection of spoke-receiving recesses 35', 37' and 38'. It is important that the noise reduction device 12' does not bow or otherwise stress the spokes 19. Accordingly, spoke-receiving recesses 35', 37' and 38' should be configured such that the spokes 19 are not stressed when received therein. The bottoms of spoke-receiving recesses 35', 37' and 38' lie in planes that are slightly offset from each other such that a small film of material 39 is formed between the bottoms of the spoke-receiving recesses 35', 37' and 38' at their intersection. This thin film 39 is preferably no greater than approximately one millimeter in thickness.

In this embodiment, spoke-receiving recesses 35', 37' and 38' have uniform widths of approximately two millimeters for accommodating regular round-shaped spokes that are approximately two millimeters in diameter. Of course, noise reduction device 12' can work with smaller diameter spokes.

Figure 10:
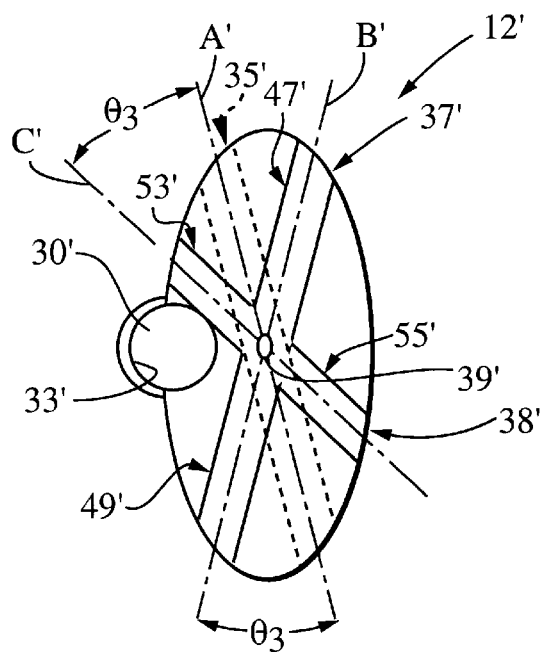
FIG. 10 is a front elevational view of the noise reduction device or magnetic device illustrated in FIG. 9.
Figure 11:
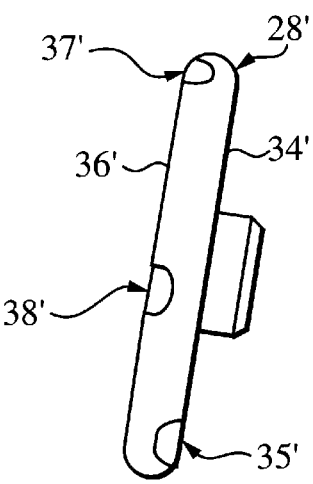
FIG. 11 is a right side view of the noise reduction device or magnetic device illustrated in FIGS. 9 and 10 as viewed along the axis of the third spoke-receiving recess or groove.
Figure 12:
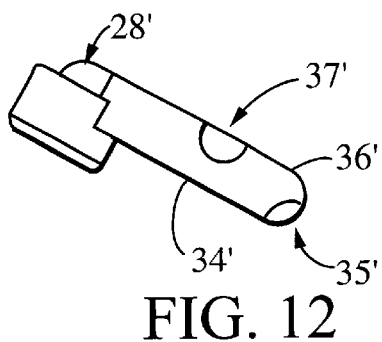
FIG. 12 is a left bottom view of the noise reduction device or magnetic device as illustrated in FIGS. 9–11 as viewed along the axis of the second spoke-receiving recess or groove.
Figure 13:
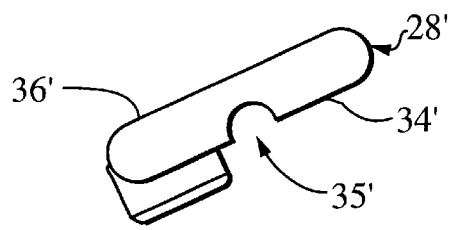
FIG. 13 is a right bottom view of the noise reduction device or magnetic device as illustrated in FIGS. 9–12 as viewed along the axis of the first spoke-receiving recess or groove.

Referring to FIGS. 9–13, first spoke-receiving recess 35' is located on first side 34' and has a center axis A' extending in a first radial direction. First spoke-receiving recess 35' is a continuous elongated groove that receives one of the spokes 19. Second and third spoke-receiving recesses 37' and 38' of second side 36' intersect with each other at the center section of body portion 28'. Accordingly, second and third spoke-receiving recesses 37' and 38' are discontinuous elongated grooves. Second spoke receiving recess 37' has a center axis B' extending in a second radial direction that forms an angle $\theta_3$ with center axis A' of first spoke-receiving recess 35'. Second spoke-receiving recess 37' has a pair of sections 47' and 49'. Third spoke-receiving recess 38' has a center axis C' extending in a third radial direction. Third spoke-receiving recess 38' has a pair of sections 53' and 55'. Third center axis C' forms an angle $\theta_3$ with first center axis A'. In this embodiment, as shown in FIG. 10, angles $\theta_3$ measure approximately 27°.

Third Embodiment

Referring now to FIGS. 14–18, a noise reduction device 112 is illustrated in accordance with another embodiment of this invention. Noise reduction device 112 can be used with monitoring device 14 of FIG. 1. In view of the similarities between this embodiment and the prior embodiment, this embodiment will not be discussed or illustrated in detail herein. Rather, it will be apparent to those skilled in the art from this disclosure that descriptions of similar parts of the prior embodiments also apply to the similar or identical parts of this embodiment.

Noise reduction device 112 has a body portion 128 with a magnet 130 received in a cylindrical magnetic portion. A magnet cavity 133 is formed in the cylindrical magnetic portion of body portion 128 for receiving magnet 130. Magnet 130 can be either frictionally or adhesively secured within cavity 133. Magnet 130 should have a magnetism that is strong enough to properly operate sensor 26 during rotation of wheel 16 (FIG. 1).

Body portion 128 is a substantially oval-shaped member having a first side 134 with a first spoke-receiving recess 135, and a second side 136 with second and third spoke-receiving recesses 137 and 138 as shown in FIGS. 14–18. These spoke-receiving recesses 135, 137 and 138 are designed such that spoke-receiving recess 135 is utilized with either spoke-receiving recess 137 or spoke-receiving recess 138 so that a pair of spokes 19 are coupled to body portion 128 at their intersection. Magnet 130 extends outwardly from first side 134.

While spoke-receiving recesses 135, 137 and 138 are shown as elongated grooves, it will be apparent to those skilled in the art that the spoke-receiving recesses can be formed by pins or protrusions extending outwardly from a body member. Accordingly, the term "spoke-receiving recess" should not be limited to a groove as shown in the figures. Rather, it will be apparent to those skilled in the art from this disclosure that the term "spoke-receiving recess" should be construed to include any space located between a pair of opposed surfaces that define a spoke-receiving space.

These three spoke-receiving recesses 135, 137 and 138 extend diagonally through a center section of body portion 128. The three spoke-receiving recesses 135, 137 and 138 have a depth such that the bottom of the recesses lie substantially in the same plane. Accordingly, at the center section of body portion 128, a small diamond-shaped hole 139 is formed at the intersection of spoke-receiving recesses 135, 137 and 138. It is important that the noise reduction device 112 does not bow or otherwise stress the spokes 19. Accordingly, spoke-receiving recesses 135, 137 and 138 be configured such that the spokes 19 are not stressed when received therein. Alternatively, the bottoms of spoke-receiving recesses 135, 137 and 138 can lie in planes that are slightly offset from each other such that a small film of material is formed between the bottoms of the spoke-receiving recesses 135, 137 and 138 at their intersection. This thin film 39 is preferably no greater than approximately one millimeter in thickness.

As shown in FIG. 15, first spoke-receiving recess 135 is a continuous elongated groove that receives one of the spokes 19. Second and third spoke-receiving recesses 137 and 138 of second side 136 intersect with each other at the center section of body portion 128. Accordingly, second and third spoke-receiving recesses 137 and 138 are discontinuous elongated grooves. Spoke-receiving recesses 135, 137 and 138 are designed to accommodate a wide range of spoke sizes and shapes as well as different spoke intersecting angles. For example, spoke-receiving recesses 135, 137 and 138 in the illustrated embodiment accommodates spokes ranging from two to three millimeters in width or diameter. Of course, the dimensions of spoke-receiving recesses 135, 137 and 138 can vary from those discussed below if needed and/or desired.

First spoke-receiving recess 135 has a pair of sections 141 and 143 that meet at the central section of body portion 128. Section 141 has a pair of side surfaces 141a and 141b. Section 143 also has a pair of side surfaces 143a and 143b. Side surface 141a is substantially parallel to side surface 143b. Side surfaces 141a and 143b preferably lie in planes that are spaced approximately three millimeters apart form each other. Similarly, side surface 141b is substantially parallel to side surface 143a. However, side surfaces 141b and 143a preferably lie in planes that are spaced approximately two millimeters apart form each other.

Second spoke-receiving recess 137 has a pair of sections 147 and 149. Section 147 has a pair of side surfaces 147a and 147b. Section 149 has a pair of side surfaces 149a and 149b. Side surface 147a is substantially parallel to side surface 149b. Side surfaces 147a and 149b preferably lie in planes that are spaced approximately two millimeters apart form each other. Similarly, side surface 147b is substantially parallel to side surface 149a. However, side surfaces 147b and 149a preferably lie in planes that are spaced approximately three millimeters apart form each other.

Third spoke-receiving recess 138 has a pair of sections 153 and 155. Section 153 has a pair of side surfaces 153a and 153b. Section 155 has a pair of side surfaces 155a and 155b. Side surface 153a is substantially parallel to side surface 155b. Side surfaces 153a and 155b preferably lie in planes that are spaced approximately two millimeters apart form each other. Side surface 153b is substantially parallel to side surface 155a. However, side surfaces 153b and 155a preferably lie in planes that are spaced approximately two millimeters apart form each other.

When noise reduction device 12 is installed on a wheel having thirty-six spokes 19, the spokes 19 intersect at approximately 270 and are typically approximately two millimeters in diameter. When the spokes 19 intersect at approximately 27°, the spokes 19 engage side surfaces 141b and 143a of first spoke-receiving recesses 135 and side surfaces 147a and 149b of second spoke-receiving recesses 137 or side surfaces 153b and 155a of third spoke-receiving recesses 138.

When noise reduction device 12 is installed on a wheel having sixteen spokes 19, the spokes 19 intersect at approximately 54°. If the spokes are flat spokes, they would typically be approximately three millimeters in diameter or width. When three millimeter spokes 19 intersect at approximately 54°, the spokes 19 engage side surfaces side surfaces 141a and 143b of first spoke-receiving recesses 135 and side surfaces side surfaces 147b and 149a of second spoke-receiving recesses 137 or side surfaces side surfaces 153a and 155b of third spoke-receiving recesses 138.

In the event that the noise reduction device 12 is installed on a wheel having spokes intersecting at angle between 27° and 54°, then the spokes will not firmly engage the side surfaces of spoke-receiving recesses 135, 137 and 138. Accordingly, noise reduction device 12 of this third embodiment accommodates spokes that intersect at any angle between 27° and 54°.

Fourth Embodiment

Figures 19, 20:
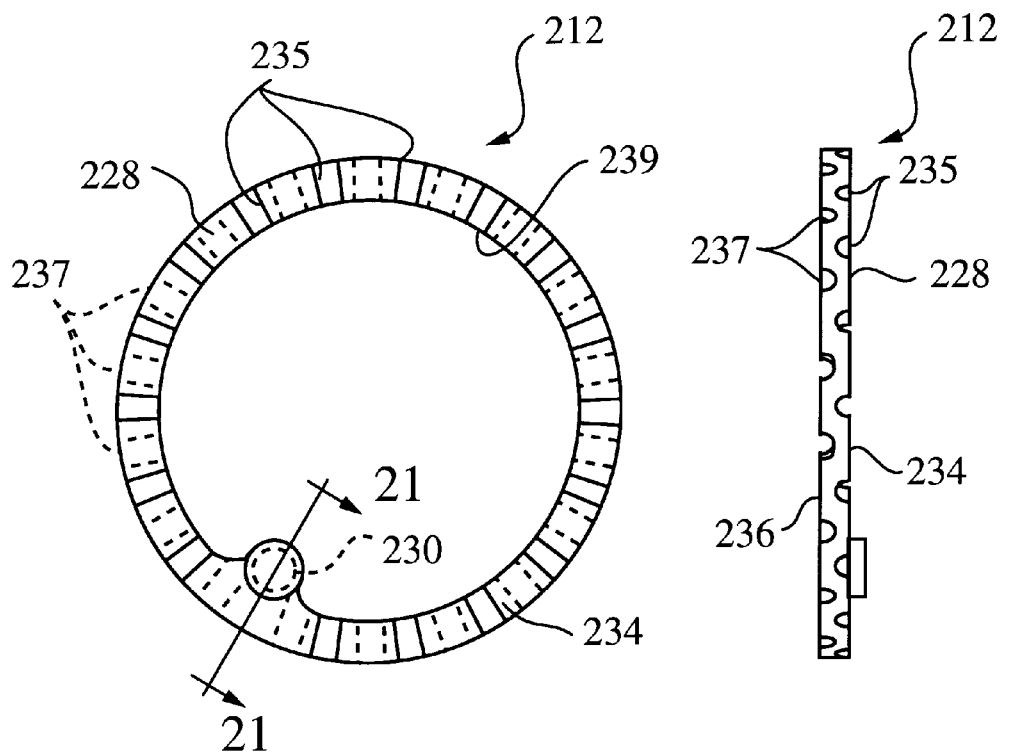
FIG. 19 is a front elevational view of a noise reduction device or magnetic device in accordance with a fourth embodiment of the present invention.
FIG. 20 is a side edge view of the noise reduction device or magnetic device illustrated in FIG. 19.
Figure 21:
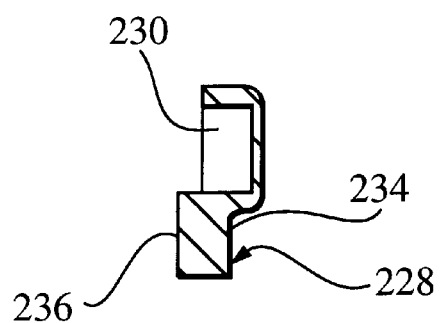
FIG. 21 is a partial cross-sectional view of the noise reduction device or magnetic device illustrated in FIGS. 19 and 20 as viewed along the section line 21—21 of FIG. 19.

Referring now to FIGS. 19–21, a noise reduction device 212 is illustrated in accordance with another embodiment of the present invention. In view of the similarities between this embodiment and the prior embodiment, this embodiment will not be discussed or illustrated in detail. Rather, it will be apparent to those skilled in the art from this disclosure that the description of similar parts of the prior embodiments also apply to the similar identical parts of this embodiment.

Noise reduction device 212 has a body portion 228 with a magnet 230 secured in a cylindrical magnetic portion of the body portion 228. In particular, the cylindrical magnetic portion of body portion 228 has a cylindrical cavity for either frictionally or adhesively securing magnet 230 therein.

In this embodiment, body portion 228 is a substantially ring-shaped member with a first side 234 having a plurality of first spoke receiving recesses 235, and a second side 236 with a plurality of second spoke-receiving recesses 237. The spoke-receiving recesses 235 and 237 are designed to be coupled between the intersection of a pair of spokes. Each spoke-receiving recess 235 or 237 includes a pair of sections that are aligned and located on opposite sides of the ring-shaped body portion 228. Each spoke-receiving recess 235 or 237 is located approximately 20° relative to the adjacent spoke-receiving recess located on this respective side. Each of the spoke-receiving recesses 235 preferably has a depth that extends half of the thickness of the body portion 228. Likewise, second spoke-receiving recesses 237 also have a depth that is substantially equal to half of the thickness of body portion 228. Accordingly, the bottom surfaces of spoke-receiving recesses 235 and 237 lie in the center planes of body portion 228. Accordingly, when noise reduction device 212 is positioned between a pair of spokes 19 at their intersection, no or little stress is applied to a pair of spokes 19.

While only four embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A noise reduction device adapted to be mounted between a first spoke and a second spoke at a point of intersection therebetween, comprising:

a body portion having a first side and a second side, said first side having at least one first spoke-receiving recess extending in a first direction to receive a portion of the first spoke therein, and said second side having at least one second spoke-receiving recess extending in a second direction to receive a portion of the second spoke therein, said first direction forming an angle with said second direction, said first and second spoke-receiving recesses having bottoms that lie substantially in the same plane.

2. A noise reduction device according to claim 1, wherein said first spoke-receiving recess has a longitudinal center axis that forms an angle of approximately 27 degrees with a longitudinal center axis of said second spoke-receiving recess.

3. A noise reduction device according to claim 1, wherein said first spoke-receiving recess has a longitudinal center axis that forms an angle of approximately 54 degrees with a longitudinal center axis of said second spoke-receiving recess.

4. A noise reduction device according to claim 1, wherein said first side includes a third spoke-receiving recess extending in a third direction which forms an angle with said first direction.

5. A noise reduction device according to claim 1, wherein said first and second spoke-receiving recesses have longitudinal center axes that intersect at a point of said body portion that is no greater than approximately one millimeter in thickness between said first and second sides.

6. A noise reduction device according to claim 1, wherein said first and second spoke-receiving recesses have bottoms that lie in planes to create an opening at a point of said body portion where longitudinal center axes of said spoke-receiving recesses intersect.

7. A noise reduction device according to claim 1, wherein said first side includes a third spoke-receiving recess extending in a third direction which forms an angle with said first and second directions, and said second side includes a fourth spoke-receiving recess extending in a fourth direction which forms an angle with said second direction.

8. A noise reduction device according to claim 7, wherein said first and second spoke-receiving recesses have bottoms that lie in planes to create an opening at a point of said body portion where longitudinal center axes of said spoke-receiving recesses intersect.

9. A noise reduction device according to claim 1, wherein said first and second sides include a plurality of additional spoke-receiving recesses that form various angles with each other.

10. A noise reduction device according to claim 9, wherein said first and second spoke-receiving recesses have bottoms that lie in planes to create an opening at a point of said body portion where longitudinal center axes of said spoke-receiving recesses intersect.

11. A noise reduction device according to claim 1, wherein said first spoke-receiving recess includes a first section extending outwardly from a central section of said body portion and a second section extending outwardly from said central section of said body portion in a substantially opposite direction from said first section, said first section having a first side surface and a second side surface with said first and second side surfaces diverging from each other as they extend outwardly from said central section of said body portion, said second section having a third side surface and a fourth side surface with said third and fourth side surfaces diverging from each other as they extend outwardly from said central section of said body portion, said second spoke-receiving recess includes a third section extending outwardly from said central section of said body portion and a fourth section extending outwardly from said central section of said body portion in a substantially opposite direction from said third section, said third section having a fifth side surface and a sixth side surface with said fifth and sixth side surfaces diverging from each other as they extend outwardly from said central section of said body portion, and said fourth section having a seventh side surface and an eighth side surface with said seventh and eighth side surfaces diverging from each other as they extend outwardly from said central section of said body portion.

12. A noise reduction device according to claim 11, wherein said first side surface is substantially parallel to said third side surface, said second side surface is substantially parallel to said fourth side surface, said fifth side surface is substantially parallel to said seventh side surface, and said sixth side surface is substantially parallel to said eighth side surface.

13. A noise reduction device according to claim 12, wherein said first side includes a third spoke-receiving recess extending in a third direction which forms an angle with said first and second directions, said third spoke-receiving recess includes a fifth section extending outwardly from said central section of said body portion and a sixth section extending outwardly from said central section of said body portion in a substantially opposite direction form said fifth section, said fifth section having a ninth side surface and a tenth side surface with said ninth and tenth side surfaces diverging from each other as they extend outwardly from said central section of said body portion, said sixth section having an eleventh side surface and a twelfth side surface with said eleventh and twelfth side surfaces diverging from each other as they extend outwardly from said central section of said body portion, and said ninth side surface is substantially parallel to said eleventh side surface, and said tenth side surface is substantially parallel to said twelfth side surface.

14. A noise reduction device according to claim 1, wherein said body portion is made of a plastic material.

15. A noise reduction device according to claim 1, further comprising magnetic material coupled to said body portion.

16. A noise reduction device according to claim 15, wherein said body portion has a magnetic portion integrally formed as in a one-piece unitary construction, with said magnetic material located in said magnetic portion.

17. A noise reduction device according to claim 16, wherein said magnetic portion including a cavity adapted to receive said magnetic material within said cavity.

18. A noise reduction device according to claim 15, wherein said first spoke-receiving recess has a longitudinal center axis that forms an angle of approximately 27 degrees with a longitudinal center axis of said second spoke-receiving recess.

19. A noise reduction device according to claim 15, wherein said first spoke-receiving recess has a longitudinal center axis that forms an angle of approximately 54 degrees with a longitudinal center axis of said second spoke-receiving recess.

20. A noise reduction device according to claim 15, wherein said first side includes a third spoke-receiving recess extending in a third direction which forms an angle with said first and second directions.

21. A noise reduction device according to claim 15, wherein said first and second spoke-receiving recesses have longitudinal center axes that intersect at a point of said body portion that is no greater than approximately one millimeter in thickness between said first and second sides.

22. A noise reduction device according to claim 15, wherein said first and second spoke-receiving recesses have bottoms that lie in planes to create an opening at a point of said body portion where longitudinal center axes of said spoke-receiving recesses intersect.

23. A noise reduction device according to claim 15, wherein said first side includes a third spoke-receiving recess extending in a third direction which forms an angle with said first and second directions, and said second side includes a fourth spoke-receiving recess extending in a fourth direction which forms an angle with said second direction.

24. A noise reduction device according to claim 23, wherein said spoke-receiving recesses have bottoms that lie in planes to create an opening at a point of said body portion where longitudinal center axes of said spoke-receiving recesses intersect.

25. A noise reduction device according to claim 15, wherein said first and second sides include a plurality of additional spoke-receiving recesses that form various angles with each other.

26. A noise reduction device according to claim 25, wherein said spoke-receiving recesses have bottoms that lie in planes to create an opening at a point of said body portion where longitudinal center axes of said spoke-receiving recesses intersect.

27. A noise reduction device according to claim 15, wherein
said first spoke-receiving recess includes a first section extending outwardly from a central section of said body portion and a second section extending outwardly from said central section of said body portion in a substantially opposite direction from said first section,
said first section having a first side surface and a second side surface with said first and second side surfaces diverging from each other as they extend outwardly from said central section of said body portion,
said second section having a third side surface and a fourth side surface with said third and fourth side surfaces diverging from each other as they extend outwardly from said central section of said body portion,
said second spoke-receiving recess includes a third section extending outwardly from said central section of said body portion and a fourth section extending outwardly from said central section of said body portion in a substantially opposite direction from said third section,
said third section having a fifth side surface and a sixth side surface with said fifth and sixth side surfaces diverging from each other as they extend outwardly from said central section of said body portion, and
said fourth section having a seventh side surface and an eighth side surface with said seventh and eighth side surfaces diverging from each other as they extend outwardly from said central section of said body portion.

28. A noise reduction device according to claim 27, wherein
said first side surface is substantially parallel to said third side surface, said second side surface is substantially parallel to said fourth side surface, said fifth side surface is substantially parallel to said seventh side surface, and said sixth side surface is substantially parallel to said eighth side surface.

29. A noise reduction device according to claim 28, wherein
said first side includes a third spoke-receiving recess extending in a third direction which forms an angle with said first and second directions,
said third spoke-receiving recess includes a fifth section extending outwardly from said central section of said body portion and a sixth section extending outwardly from said central section of said body portion in a substantially opposite direction from said fifth section,
said fifth section having a ninth side surface and a tenth side surface with said ninth and tenth side surfaces diverging from each other as they extend outwardly from said central section of said body portion,
said sixth section having an eleventh side surface and a twelfth side surface with said eleventh and twelfth side surfaces diverging from each other as they extend outwardly from said central section of said body portion, and
said ninth side surface is substantially parallel to said eleventh side surface, and said tenth side surface is substantially parallel to said twelfth side surface.

30. A monitoring device for a bicycle, comprising:
a sensing device adapted to be coupled to a portion of the bicycle that is adjacent a wheel of the bicycle;
a display unit operatively coupled to said sensing device and adapted to be mounted on a handlebar of the bicycle; and
a magnetic device adapted to be mounted on wheel spokes, said magnetic device having a body portion with magnetic material, said body portion having a first side and a second side, said first side having a first spoke-receiving recess extending in a first direction to receive a portion of the first spoke therein, and said second side having a second spoke-receiving recess extending in a second direction to receive a portion of the second spoke therein, said first direction forming an angle with said second direction, said first and second spoke-receiving recesses having bottoms that lie substantially in the same plane, said sensing device being operated by said magnetic device.

31. A monitoring device according to claim 30, wherein
said first spoke-receiving recess has a longitudinal center axis that forms an angle of approximately 27 degrees with a longitudinal center axis of said second spoke-receiving recess.

32. A monitoring device according to claim 30, wherein
said third spoke-receiving recess has a longitudinal center axis that forms an angle of approximately 54 degrees with said longitudinal center axis of said second spoke-receiving recess.

33. A monitoring device for a bicycle, comprising:
a sensing device adapted to be coupled to a portion of the bicycle that is adjacent a wheel of the bicycle;
a display unit operatively coupled to said sensing device and adapted to be mounted on a handlebar of the bicycle; and
a magnetic device adapted to be mounted on wheel spokes, said magnetic device having a body portion with magnetic material, said body portion having a first side and a second side, said first side having a first spoke-receiving recess extending in a first direction to receive a portion of the first spoke therein, and said second side having a second spoke-receiving recess extending in a second direction to receive a portion of the second spoke therein, said first direction forming an angle with said second direction, said sensing device being operated by said magnetic device,
said first side including a third spoke-receiving recess extending in a third direction which forms an angle with said first and second directions.

34. A monitoring device according to claim 30, wherein
said first and second spoke-receiving recesses have longitudinal center axes that intersect at a point of said body portion that is no greater than approximately one millimeter in thickness between said first and second sides.

35. A monitoring device according to claim 30, wherein
said first and second spoke-receiving recesses have bottoms that lie in planes to create an opening at a point of said body portion where longitudinal center axes of said spoke-receiving recesses intersect.

36. A monitoring device according to claim 33, wherein
said second side includes a fourth spoke-receiving recess extending in a fourth direction which forms an angle with said second direction.

37. A monitoring device according to claim 36, wherein
said spoke-receiving recesses have bottoms that lie in planes to create an opening at a point of said body portion where longitudinal center axes of said spoke-receiving recesses intersect.

38. A monitoring device for a bicycle, comprising:
a sensing device adapted to be coupled to a portion of the bicycle that is adjacent a wheel of the bicycle;
a display unit operatively coupled to said sensing device and adapted to be mounted on a handlebar of the bicycle; and
amagnetic device adapted to be mounted on wheel spokes, said magnetic device having a body portion with magnetic material, said body portion having a first side and a second side, said first side having a first spoke-receiving recess extending in a first direction to receive a portion of the first spoke therein, and said second side having a second spoke-receiving recess extending in a second direction to receive a portion of the second spoke therein, said first direction forming an angle with said second direction, said sensing device being operated by said magnetic device,
said first and second sides including a plurality of additional spoke-receiving recesses that form various angles with each other.

39. A monitoring device according to claim 38, wherein
said spoke-receiving recesses have bottoms that lie in planes to create an opening at a point of said body portion where longitudinal center axes of said spoke-receiving recesses intersect.

40. A monitoring device for a bicycle, comprising:
a sensing device adapted to be coupled to a portion of the bicycle that is adjacent a wheel of the bicycle;
a display unit operatively coupled to said sensing device and adapted to be mounted on a handlebar of the bicycle; and
a magnetic device adapted to be mounted on wheel spokes, said magnetic device having a body portion with magnetic material, said body portion having a first side and a second side, said first having a first sopke-receiving recess extending in a first direction to receive a portion of the first spoke therein, and said second side having a second spoke-receiving recess extending in a second direction to receive a portion of the second spoke therein, said first direction forming an angle with said second direction, said sensing device being operated by said magnetic device,
said first spoke-receiving recess including a first section extending outwardly from a central section of said body portion and a second section extending outwardly from said central section of said body portion in a substantially opposite direction form said first section,
said first section having a first side surface and a second side surface with said first and second side surfaces diverging from each other as they extend outwardly from said central section of said body portion,
said second section having a third side surface and a fourth side surface with said third and fourth side surfaces diverging from each other as they extend outwardly from said central section of said body portion,
said second spoke-receiving recess including a third section extending outwardly from said central section of said body portion and a fourth section extending outwardly from said central section of said body portion in a substantially opposite direction form said third section,
said third section having a fifth side surface and a sixth side surface with said fifth and sixth side surfaces diverging from each other as they extend outwardly from said central section of said body portion, and
said fourth section having a seventh side surface and an eighth side surface with said seventh and eighth side surfaces diverging from each other as they extend outwardly from said central section of said body portion.

41. A monitoring device according to claim 40, wherein
said first side surface is substantially parallel to said third side surface, said second side surface is substantially parallel to said fourth side surface,
said fifth side surface is substantially parallel to said seventh side surface, and said sixth side surface is substantially parallel to said eighth side surface.

42. A monitoring device according to claim 41, wherein
said first side includes a third spoke-receiving recess extending in a third direction which forms an angle with said first and second directions,
said third spoke-receiving recess includes a fifth section extending outwardly from said central section of said body portion and a sixth section extending outwardly from said central section of said body portion in a substantially opposite direction form said fifth section,
said fifth section having a ninth side surface and a tenth side surface with said ninth and tenth side surfaces diverging from each other as they extend outwardly from said central section of said body portion,
said sixth section having an eleventh side surface and a twelfth side surface with said eleventh and twelfth side surfaces diverging from each other as they extend outwardly from said central section of said body portion,
said ninth side surface is substantially parallel to said eleventh side surface, and said tenth side surface is substantially parallel to said twelfth side surface.

43. A monitoring device according to claim 30, wherein
said body portion has a magnetic portion integrally formed in a one-piece unitary construction, with said magnetic material located in said magnetic portion.

44. A monitoring device according to claim 43, wherein
said magnetic portion includes a cavity adapted to receive said magnetic material within said cavity.

* * * * *